United States Patent
Disch et al.

(10) Patent No.: US 8,053,499 B2
(45) Date of Patent: Nov. 8, 2011

(54) COLORED POLYOXYMETHYLENE MOLDING COMPOUNDS AND MOLDED PARTS PRODUCED THEREFROM

(75) Inventors: Stefan Disch, Konigsstein (DE); Gerhard Reuschel, Liederbach (DE); Ernst Hofmann, Haibach (DE); Klaus Kurz, Kelsterbach (DE)

(73) Assignee: Ticona GmbH, Sulzbach (DE)

( * ) Notice: Subject to any disclaimer, the term of this patent is extended or adjusted under 35 U.S.C. 154(b) by 498 days.

(21) Appl. No.: 12/125,603

(22) Filed: May 22, 2008

(65) Prior Publication Data

US 2008/0287580 A1   Nov. 20, 2008

Related U.S. Application Data

(63) Continuation of application No. 10/381,502, filed as application No. PCT/EP01/10711 on Sep. 17, 2001, now abandoned.

(30) Foreign Application Priority Data

Sep. 26, 2000 (DE) .................. 100 47 488
Jun. 1, 2001 (DE) .................. 100 26 787

(51) Int. Cl.
*C08K 5/34* (2006.01)
*C08K 5/103* (2006.01)
*C08K 5/098* (2006.01)

(52) U.S. Cl. .......... 524/94; 524/100; 524/106; 524/306; 524/308; 524/310; 524/400

(58) Field of Classification Search .............. 524/306, 524/308, 310, 400, 94, 100, 106
See application file for complete search history.

(56) References Cited

U.S. PATENT DOCUMENTS

| 4,456,710 A | 6/1984 | Luders et al. |
| 5,039,741 A | 8/1991 | Burg et al. |
| 5,191,006 A | 3/1993 | Matsumoto et al. |
| 5,919,849 A | 7/1999 | Memon et al. |
| 5,962,623 A | 10/1999 | Eckardt et al. |
| 6,051,660 A | 4/2000 | Oka et al. |
| 6,147,146 A | 11/2000 | Horio et al. |
| 6,306,940 B1 | 10/2001 | Disch et al. |
| 6,590,020 B1 | 7/2003 | Eberle et al. |

FOREIGN PATENT DOCUMENTS

| EP | 0498620 | 8/1992 |
| EP | 0605736 | 7/1994 |
| EP | 0853098 A1 | 7/1998 |
| JP | A4145114 | 5/1992 |
| WO | WO-9821280 | 5/1998 |
| WO | WO-9937709 | 7/1999 |
| WO | WO-00/00547 | 1/2000 |

OTHER PUBLICATIONS

Derwent Abstract of AN 95-273023, XP-002182398 and JP07-173368 A (Mitsubishi Gas Chem Co Inc) [Jul. 11, 1995].
Derwent Abstract of AN 96-075095, XP-002182397 and JP 07-331028 A (Mitsubishi Gas Chem Co Inc) [Dec. 19, 1995].
Abstract—JP07070405; published Mar. 14, 1995.
Abstract—JP07173368; published Jul. 11, 1995.

*Primary Examiner* — Vickey Nerangis
(74) *Attorney, Agent, or Firm* — Dorrity & Manning, P.A.

(57) ABSTRACT

The present invention relates to a polyoxymethylene molding composition comprising (A) 0.1-5.0% by weight of colorant,
(B) 0.01-0.5% by weight of a nitrogen-containing stabilizer,
(C) 0.05-1% by weight of an ester of a polyhydric alcohol and at least one fatty acid, and
(D) 0.001-0.5% by weight of a metal salt of a fatty acid, and
(I) polyoxymethylene polymer and, where appropriate, up to 40% by weight of other conventional additives, and variants of this constitution in advantageous versions.

In the case of these polyoxymethylene molding compositions the selection of the colorants is no longer restricted to conventional colorants suitable particularly for POM.

The products produced therewith are particularly stable during processing and feature low formaldehyde emission, defect-free surfaces, and high color fastness.

30 Claims, No Drawings

COLORED POLYOXYMETHYLENE MOLDING COMPOUNDS AND MOLDED PARTS PRODUCED THEREFROM

RELATED APPLICATIONS

This application is a continuation application of U.S. patent application Ser. No. 10/381,502, filed May 28, 2003, which is a National Stage application of International Application No. PCT/EP01/10711, filed Sep. 17, 2001, and which claims benefit to German application No. 100 47 488.8, filed Sep. 26, 2000 and German application No. 100 26 787.8, filed Jun. 1, 2001.

The present invention relates to colored polyoxymethylene molding compositions suitable for producing colored moldings or colored extrudates. The products produced therewith are particularly stable during processing and are notable for low formaldehyde emission, defect-free surfaces and high color fastness. This application pertains to the German patent applications DE 10126787.8 and DE 10047488.8, which are hereby incorporated by reference. They are therefore part of the disclosure content of this patent application.

Since their market introduction about 40 years ago, polyoxymethylenes have become established as extremely useful engineering materials in a variety of applications. POM finds broad application particularly as a construction material in automotive construction, in the electrical industry, and in medical engineering. Examples thereof can be found in the application-related brochures of the POM manufacturers. POM molding compositions are required to have a certain level of mechanical properties such as stiffness, hardness, and toughness, allowing these materials to be used for industrial components such as cogs, levers, and many others. The figures for the yield stress that are published in the brochures from the manufacturers of POM copolymers lie between 60 and 70 N/mm$^2$. For the tensile elastic modulus of unmodified copolymers the figures to be found therein are between 2400 and 3100 N/mm$^2$. For the elongation at break, figures of between 10 and 30% are found.

On the basis of these advantageous properties of POM molding compositions there exists a need to use polyoxymethylenes for visible parts as well and to open up further fields of application for these materials. To this end it is often necessary to adapt the material optically, i.e., in terms of color. For this purpose, colorants in the form of pigments or polymer-soluble dyes are admixed to the POM molding compositions.

It is common knowledge (Damm, W. and Hermann, E., in Gächter, Möller, Plastic Additives, 3rd Edition 1989, p. 730) that POM in particular is very difficult to color. The sensitivity of this material to extraneous substances, particularly when the latter contain acid or acidic groups, which is often the case with colorants, leads to the possibility of processing being accompanied by breakdown of the material, with subsequent release of formaldehyde, severely adversely affecting the usefulness of the material for producing moldings. The automobile industry, as one of the most important markets for POM products, has developed special analytical methods for determining the emission of formaldehyde from POM moldings (VDA [German automakers association] recommendation No. 275, Dokumentation Kraftfahrwesen e.V. July 1994).

So that the processing of colored POM molding compositions is not accompanied by any detraction from the properties of either the product of the material, the breakdown in the material in colored POM molding compositions must be suppressed. This purpose is served by the addition of stabilizers. However, even the addition of stabilizers has to date been unable to remedy the shortcoming of the high emission. Moreover, known stabilizers and stabilizer systems which result in a reduction in formaldehyde emission have an adverse effect on other required material properties, especially the color fastness and the surface quality, but also the profile of mechanical properties and the formation of mold deposits.

The requirements imposed on colored polyoxymethylene molding compositions in respect of processing properties have seen a steady increase in recent years. On the one hand, in order to produce moldings of polyoxymethylene for use in the automotive, electrical, and medical engineering sectors, there is increasing use of the hot runner technology in injection molds. On the other hand, not only the injection molds but also the molding geometries are becoming increasingly more complex. These developments result in colored polyacetal molding compositions being exposed to relatively high temperatures during processing, which in the case of colored polyacetal molding compositions available commercially to date results in high formaldehyde emissions and in defects on the surface.

JP 07331028 describes a composition for a colored polyoxymethylene copolymer. In addition to a sterically hindered phenol, an amine-substituted triazine, a metal salt, an ester of a polyhydric alcohol having 2-10 carbon atoms and a fatty acid having 10-32 carbon atoms, and an amide of a fatty acid having more than 10 carbon atoms, water, an amine compound, and an alcohol are added.

JP 07173368 describes a composition for a colored polyoxymethylene molding compound which is composed of a sterically hindered phenol, an amino-substituted amino compound, hydroxides or alkoxides of alkali metals or alkaline earth metals or salts thereof with inorganic acids, a metal salt of a fatty acid, and an amide of a higher fatty acid.

WO 0516734 claims a polyacetal composition with reduced formaldehyde odor. With this composition, an ester of a polyhydric alcohol with a fatty acid has been applied to the surface of the polyacetal granules.

EP 562856 describes a polyoxymethylene composition featuring reduced emissions and improved molding surfaces. The molding composition is composed of 0.01-5% of a sterically hindered phenol, 0.01-10% of melamine-formaldehyde condensate, and 0.05-4% of a fatty acid ester of a polyhydric alcohol.

All of the compositions described in the cited prior art do not lead to sufficiently low emission of formaldehyde.

Although the use of POM as carrier material for pigments, as indicated above, is already known, to date there has been no satisfactory remedy of the existing shortcoming of the chemical instability and subsequent formaldehyde elimination during processing and from moldings. Existing stabilizer systems which lead to a reduction in the formaldehyde emission result in the formation of defects on molding surfaces or to a reduction of the color fastness.

The object was therefore to develop novel colored POM molding compositions in which the formaldehyde emission observed to date is substantially reduced. The moldings produced from these molding compositions ought to have defect-free surfaces and high color fastness, without detracting from the other known, advantageous properties of POM.

This object is achieved by a polyoxymethylene molding composition comprising the following components:
(A) from 0.1 to 5.0% by weight of colorant,
(B) from 0.01 to 0.5% by weight of a nitrogen-containing stabilizer,
(C) from 0.05 to 1% by weight of an ester of a polyhydric alcohol and at least one fatty acid, and (D) from 0.001 to 0.5% by weight of a metal salt of a fatty acid, but where the molding composition does not comprise hydroxides or alkoxides of alkali metals or alkaline earth metals, or their salts with inorganic acids.

In one advantageous version of the invention the molding composition further comprises components (E) to (H):

(E) up to 1% by weight of a metal salt of a short-chain carboxylic acids
(F) up to 1.0% by weight of a sterically hindered phenol compound,
(G) up to 1.0% by weight of at least one stabilizer selected from the group consisting of the benzotriazole derivatives or that of the benzophenone derivatives, or that of the aromatic benzoate derivatives,
(H) up to 0.5% by weight of a sterically hindered amine (HALS) as light stabilizer,
(I) polyoxymethylene polymer and, where appropriate, up to 40% by weight of other conventional additives.

Surprisingly it has found that as a result of the inventive constitution of the polyoxymethylene molding composition the selection of the colorants is no longer restricted to conventional colorants particularly suitable for POM. Moreover, it has surprisingly been found that colored polyoxymethylene molding compounds having the inventive constitution possess an extremely low formaldehyde emission and high processing stability and that moldings produced from the molding compositions of the invention exhibit very low formaldehyde emission, defect-free surfaces, and high color fastness. The amounts in % by weight are based on the total weight of the molding composition.

As colorants (A) it is possible to use 0.1-5.0% by weight, preferably 0.5-2.0%, of any desired inorganic pigments, such as titanium dioxide, ultramarine blue, or cobalt blue, or organic pigments and colors, such as phthalocyanines, anthraquinones or carbon black, either individually or as a mixture, or together with polymer-soluble dyes.

The molding composition of the invention contains 0.01-0.5%, preferably 0.03-0.3%, of a nitrogen-containing stabilizer (B). Suitable nitrogen-containing stabilizers are heterocyclic compounds having at least one nitrogen atom as heteroatom, adjacent to which is either an amino-substituted carbon atom or a carbonyl group, such as, for example, pyridazine, pyrimidine, pyrazine, pyrrolidone, aminopyridine, and compounds derived therefrom. Advantageous compounds of this generic type are aminopyridine and compounds derived therefrom. Suitable in principle are all aminopyridines, such as, for example, melamine, 2,6-diaminopyridine, substituted and dimeric aminopyridines, and mixtures prepared from these compounds. Also of advantage are polyamides and dicyandiamide, urea and its derivatives, and pyrrolidone, and compounds derived therefrom. Examples of suitable pyrrolidones are, for example, imidazolidinone and compounds derived therefrom, such as, for example, hydantoin, its derivatives being particularly advantageous, and of these compounds allantoin and its derivatives being especially advantageous. Also particularly advantageous are triamino-1,3,5-triazine (melamine) and its derivatives, such as, for example, melamine-formaldehyde condensates and methylolmelamine. Very particular preference is given to melamine, methylolmelamine, melamine-formaldehyde condensates, and allantoin. The nitrogen-containing stabilizers may be used individually or in combination.

As component (C) use is made of 0.05-1% by weight, preferably 0.1-0.5% by weight, of an ester of a polyhydric alcohol and at least one fatty acid (C), esters of higher fatty acids having 10-32 carbon atoms, preferably 24-32 carbon atoms, and polyhydric alcohols of 2-8 carbon atoms, preferably 2-5 carbon atoms. The acids need not be completely esterified, but can also be only partly esterified, and/or the esters can be partly hydrolyzed. Particularly preferred alcohols are ethylene glycol, glycerol, butylene glycol, and pentaerythritol; among the fatty acids, montanic acids are particularly preferred. Especially preferred esters are diesters of glycol or glycerol and montanic acids (Licowachs E and Licolub WE4, manufacturer: Clariant AG).

As component (D), 0.001-0.5% by weight, preferably 0.01-0.2%, more preferably 0.01-0.1%, of a metal salt of a fatty acid (D) is present in the molding composition of the invention. Use may be made of alkali metal and alkaline earth metal salts or salts of other divalent metal ions, e.g., $Zn^{2+}$, of long-chain fatty acids having 10 to 32 carbon atoms, examples being stearates, laurates, oleates, behenates, montanates, and palmitates. The fatty acids may be either unsaturated or saturated and may also be substituted by hydroxyl or amino groups. Preference is given to alkaline earth metal salts and zinc salts of stearic acid and of montanic acids.

The further constituents, components (E) to (H), of the molding composition of the invention are optional and need not necessarily be present for the required profile of properties to be attained. However, each of these components improves at least one of the properties of low emission, defect-free surface, and color fastness.

As component (E) it is possible for 0.0-1.0% by weight, preferably 0.01-0.05% by weight, more preferably 0.05-0.2% by weight of a metal salt of a short-chain carboxylic acid (E) to be present. All monovalent and divalent metal ions are possible, but alkali metals and alkaline earth metals are preferred. The short-chain carboxylic acids possess 3-8 carbon atoms. Preference is given to propionates, citrates, and pyruvates. Calcium citrate is particularly preferred.

The molding composition may contain from 0.0 to 1.0% by weight, preferably 0.0-0.4%, more preferably 0.0-0.1%, of a sterically hindered phenol compound (F). Examples of such compounds, which are available commercially, are pentaerythrityl tetrakis[3-(3,5-di-tert-butyl-4-hydroxyphenyl) propionate] (Irganox 1010, Ciba Geigy), triethylene glycol bis[3-(3-tert-butyl-4-hydroxy-5-methylphenyl)propionate] (Irganox 245, Ciba Geigy), 3,3'-bis[3-(3,5-di-tert-butyl-4-hydroxyphenyl)propionohydrazide] (Irganox MD 1024, Ciba Geigy), hexamethylene glycol bis[3-(3,5-di-tert-butyl-4-hydroxyphenyl)propionate] (Irganox 259, Ciba Geigy), and 3,5-di-tert-butyl-4-hydroxytoluene (Lowinox BHT, Great Lakes). Preference is given to Irganox 1010 and especially Irganox 245.

The molding composition may further contain 0.0-1.0% by weight, preferably 0.01-0.9% by weight, more preferably 0.02-0.8% by weight of at least one stabilizer selected from the group consisting of the benzotriazole derivatives, or that of the benzophenone derivatives, or that of the aromatic benzoate derivatives (G). Preference is given to 2-[2'-hydroxy-3',5'-bis(1,1-dimethylbenzyl)phenyl]benzotriazole, available commercially as Tinuvin 234 (Ciba Geigy).

As component (H) it is possible for 0.0-0.5% by weight, preferably 0.01-0.4% by weight, with particular preference 0.4% by weight, of a sterically hindered amine used as light stabilizer (HALS) (H) to be present in the molding composition of the invention. Preference is given to 2,2,6,6-tetramethyl-4-piperidyl compounds, e.g., bis(2,2,6,6-tetramethyl-4-piperidyl) sebacate (Tinuvin 770, Ciba Geigy) or the polymer of dimethyl succinate and 1-(2-hydroxyethyl)-4-hydroxy-2,2,6,6-tetramethyl-4-piperidine (Tinuvin 622, Ciba Geigy).

The polyoxymethylene polymers (I) used as base material for the colored molding compositions may be polyoxymethylene homopolymers or polyoxymethylene copolymers. Polymers of this kind are known to the skilled worker and are described in the literature, such as for example in "Saechtling, Kunststoff-Taschenbuch, Hanser-Verlag, 27th Edition, pages 462 to 465, hereby incorporated by reference. The homopolymers are prepared generally by polymerization of formaldehyde or trioxane, it being possible for the polymerization to be initiated cationically or anionically. Preference, however, is given to polyoxymethylene copolymers which in addition to oxymethylene units contain oxyalkylene units as well, the alkylene groups possibly containing 2-8 carbon units, linear or branched. Particular preference is given to polyoxymethylene polymers which have essentially oxymethylene and oxyethylene units in the polymer chain. The fraction of the oxyethylene units among the structural units of the polymer chain is from 0.1 to 15 mol %, preferably from 0.2 to 10 mol %. The melt index MFI, measured in accordance with ISO 1133 at 190° C. and an applied weight of 2.16 kg, is 0.5-75 g/10 min, preferably 2-60 g/10 min, and more preferably 5-35 g/10 min. The numerical average of the molecular weight is at least 5000 g/mol and not more than 100,000 g/mol, determined by GPC in dimethylacetamide at 150 to 160° C. instead of an individual POM copolymer it is also possible to use a mixture of different polyoxymethylene copolymers differing in constitution. The POM copolymers can be prepared by processes which are common knowledge. One possible process, for example, is to copolymerize trioxane with dioxolane in the presence of standard amounts of $BF_3$ and methylal. The polyoxymethylene molding composition of the invention generally contains at least 30% by weight, advantageously at least 40% by weight, with particular advantage at least 50% by weight of polyoxymethylene polymer. The polyoxymethylene molding composition of the invention contains up to 99.839% by weight of polyoxymethylene polymer, component (I), advantageously up to 99.369% by weight, 99.84% by weight or 99.836% by weight, with 99.69% by weight being particularly advantageous. Further preferred versions of the invention are apparent from the examples.

The molding composition of the invention may comprise further customary additives, individually or as a mixture, of up to 40% by weight, examples being nucleating agents such as polyoxymethylene terpolymers or talc, fillers such as glass beads, wollastonite, loam, molybdenum disulfide or graphite, inorganic or organic fibers such as glass fibers, carbon fibers or aramid fibers, glass fibers with a length of >3 mm, in particular a length of 5 to 50 mm, and thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates.

One particularly preferred embodiment of the invention is a specific constitution of a polyoxymethylene molding composition which owing to the surprising finding of an interaction between two components exhibits a particularly low formaldehyde emission. Said molding composition comprises:
components (A) and (B) as described above,
(C1) x % by weight of an ester of a polyhydric alcohol and at least one fatty acid,
(C2) y % by weight of a partially hydrolyzed ester of a polyhydric alcohol and at least one fatty acid,
x being greater than 0.01% by weight, y being smaller than 0.99% by weight, and the sum of x and y being smaller than 1.0% by weight,
(D) 0.0-0.5% by weight of a metal salt of a fatty acid,
and, where appropriate, additionally components (E) to (I) which are as described above.

Surprisingly it has been found that through the use of a mixture of the components (C1) and (C2) it is possible to achieve particularly low emissions, based on an interaction between the two components that is favorable for the formaldehyde emission level. As a result of this interaction the presence of component (D) is not absolutely necessary and can be used in order to meet even strict requirements imposed on the formaldehyde emission from moldings made of colored polyoxymethylene, since the additional use of (D) leads to a further reduction in formaldehyde emission.

X amounts to 0.01-1% by weight, preferably 0.1-0.5% by weight of component (C1), which is an ester of a polyhydric alcohol and at least one fatty acid. Use may be made of esters of higher fatty acids having 10-32 carbon atoms, preferably 24-32 carbon atoms, and polyhydric alcohols of 2-8 carbon atoms, preferably 2-5 carbon atoms. The polyhydric alcohols need not be completely esterified but may also be partially esterified. Preferred alcohols are ethylene glycol, glycerol, butylene glycol, and pentaerythritol, while preference among the fatty acids is given to montanic acids. Particularly preferred esters are diesters of glycol or glycerol and montanic acids (Licowachs E and Licolub WE4, manufacturer: Clariant AG).

y amounts to 0.01-1% by weight, preferably 0.1-0.5% by weight, of component (C2), it being possible to use partially hydrolyzed esters of polyhydric alcohols and at least one fatty acid. These are partially hydrolyzed esters of higher fatty acids having 10-32 carbon atoms, preferably 24-32 carbon atoms, and polyhydric alcohols of 2-8 carbon atoms, preferably 2-5 carbon atoms. The partially hydrolyzed esters can be prepared by reacting a full ester with a metal hydroxide. It is also possible to use mixtures of partially hydrolyzed esters of a partially esterified polyhydric alcohol with a metal salt of the corresponding fatty acids.

Preferred alcohols are ethylene glycol, glycerol, butylene glycol, and pentaerythritol, while among the fatty acids preference is given to montanic acids. Preferred metals are those which occur in the form of monovalent or divalent ions, e.g., alkali metals and alkaline earth metals. Particular preference is given to a partially hydrolyzed ester of butylene glycol and montanic acids in which excess montanic acid units have been hydrolyzed with calcium hydroxide (Licowachs OP, manufacturer: Clariant AG).

The colored POM molding compositions of the invention can be prepared using the conventional mixing techniques such as granulating, extruding, compounding, etc. The molding compositions of the invention are preferably prepared by mixing polyoxymethylene polymer with colorants and stabilizers and then granulating the mixture. Preferred versions of the invention, where not already present in the description, are apparent from the examples.

The colored POM molding compositions of the invention feature a substantially reduced level of emissions. The reduction in the release of formaldehyde can be observed even during the preparation of the molding composition, e.g., during granulating, and also during processing. Accordingly, the polyoxymethylene composition of the invention makes a contribution to occupational hygiene and workplace safety. In particular, however, there is a substantial reduction in the emission of formaldehyde from moldings produced by injection molding or extrusion. Thus the formaldehyde emission level, measured on sheets with a wall thickness of 1 mm after a storage period of 24 h in accordance with VDA 275, is generally less than 20 mg/kg, preferably less than 10 mg/kg.

The molding compositions of the invention and the moldings produced from them possess a high color fastness. By color fastness or color stability is meant that the color difference ΔE, determined in accordance with DIN 6174, which occurs after the processing of the molding compound or during the use of the moldings produced therefrom, is small. Users of colored polyoxymethylene moldings impose exacting requirements on the color fastness. The automobile industry, for example, tests polymeric moldings for use in the automobile in weathering tests conducted under conditions such as prevailing in Florida or Arizona; in other words, the color fastness must be ensured under exposure both to high temperatures and to sunlight. Such conditions are generally simulated in the laboratory: for applications in the automobile interior, for example, testing is carried out in accordance with central standard PV 1303 (hot light fastness test) (3rd amendment to PV 1303 of December 1993) at a black panel temperature of 100° C., a sample chamber temperature of 65° C., a relative humidity of 20%, and a xenon light intensity of 60 W/m$^2$ at 300 to 400 nm (further details in DIN 75202). The color change of the molding is reported using the gray scale step in accordance with DIN 54001. Moldings made from the molding compositions of the invention meet the exacting requirements of the PV 1303 hot light fastness test if the molding compositions comprise the UV stabilizers (G) and (H). However, even molding compositions which do not contain components (G) and (H) exhibit a surprisingly high color fastness on exposure to light or high temperatures. These molding compositions are especially suitable for producing moldings for use in the toy, electronics or medical engineering sector.

By a defect-free surface is meant the ability to produce complex surfaces by injection molding without spattering, discoloration, local color differences, or marks. In the production of complex surfaces, e.g., in the case of speaker grills, by injection molding, processors are increasingly adopting the hot runner technology. The polymer melt is injected generally through two or more hot runner nozzles into the mold chamber. Within the hot runners and the nozzles the temperatures which occur are generally high, and in the case of polyoxymethylene polymers may result in breakdown of the material. As a result of this high thermal stressing of the material it was often not possible to produce defect-free surfaces with conventional constitutions of polyoxymethylene molding compositions. At the premises of the plastics processor, the unsatisfactory thermal stability is manifested in high failure rates during production, which detracts from the economic processing of polyoxymethylene molding compositions. With the molding compositions of the invention it is possible to realize defect-free surfaces in conjunction with complex moldings.

The mechanical properties of the molding compositions of the invention correspond to the normal requirements imposed on commercial POM products, so that the application fields and processing techniques customary for POM can be utilized without restriction.

Particular fields of use for the molding compositions of the invention are interiors and linings of means of transport such as automobiles, aircraft, etc., household products, toys, baby ware, and also electronic and electrical components and appliances. The molding compositions of the invention are especially suitable for producing apparatuses and instruments, or parts thereof, for medical applications. As compared with the state of the art commercial products, the molding compounds prepared in accordance with the invention exhibit the lowest formaldehyde emission, possess defect-free surfaces, and have a high color fastness when the moldings are exposed to light or heat for a long period of time. The intention of the examples of below is to illustrate the particular advantages of the present invention, without wishing to restrict it to these examples, however.

All literature references mentioned in this patent specification are hereby incorporated by reference. These literature references are therefore part of the disclosure content of this patent specification.

EXAMPLES

In the following examples the properties of the materials were determined by the following methods:
Melt index (MFI) in accordance with ISO 1133 at 190° C. and 2.16 kg applied weight;
Tensile elasticity modulus in accordance with ISO 527
Yield stress in accordance with ISO 527
Elongation at break in accordance with ISO 527

Formaldehyde emission: The colored POM molding compositions are used to manufacture sheets with a wall thickness of 1 mm. After a storage time of 24 hours the formaldehyde emission from the sheets was determined in accordance with VDA 275 (VDA [German Automakers Association] recommendation No. 275, Dokumentation Kraftfahrwesen e.V. July 1994). Test specimen production: The polyacetal granules are injection molded to platelets measuring 80*50*1 mm. A Kraus Maffei KM 120/340B injection molding machine is used, with the following injection molding parameters: melt temperature 195° C., flow front rate 200 mm/s, mold wall temperature 85° C., holding pressure 900 bar, holding pressure time 30 s, cooling time 10 s, back pressure 0 to 10 bar. Prior to testing, the test specimens are stored for 24 hours in a standard-climate cabinet at 23° C. and 50% relative humidity.

Testing: Two test specimens are suspended in a 1 l glass bottle above 50 ml of DI water on a stainless steel hook and are stored in a forced-air drying cabinet at 60° C. for 3 hours. The test specimens are removed from the test bottle. 5 ml of sample solution are pipetted into a test tube, which is heated at 95° C. for 10 minutes. Then 3 ml of acetylacetone and 3 ml of 20% strength ammonium acetate solution are added to the test tube. The formaldehyde together with the reagents forms the diacetyldihydrolutidine complex, whose absorption at 412 nm is determined photometrically. From the absorption, the concentration of formaldehyde in the sample solution is calculated.

Color fastness (hot light fastness) to PV 1303: The colored POM molding compositions are used to manufacture sheets with a wall thickness of 1 mm. The sheets are tested in accordance with the central standard PV 1303 of Volkswagen AG (3rd amendment to PV 1303 of December 1993) for xenon arc synchronization exposure on a xenon test apparatus 1200 CPS from Heraeus. The gray scale was determined in accordance with DIN 54001. A Macbeth Spectra Light color matching source in accordance with DIN 6173 T2 was used. The endpoint determination was carried out in accordance with DIN 75202 VDA data sheet 3/91, by measuring the total color difference of the light fastness scale step 6 before and after the cyclical test. Each sample was evaluated after 5 and 10 successive cycles for the gray scale step in accordance with DIN 54001. The total run time of the test for 10 cycles was 360 hours. In a test to PV 1303 the samples under analysis are positioned with a white polyester nonwoven behind them. Exposure is carried out at a black panel temperature of 100°

C., a sample chamber temperature of 65° C., a relative humidity of 20%, and a xenon light intensity of 60 W/m² at 300 to 400 nm. For further details, refer to DIN 75202. The endpoint of an exposure period is determined in accordance with DIN 75202. This is done by exposing the standard coloration 6 of the light fastness scale together with the test specimens. The endpoint has been reached when the standard coloration 6 has reached a contrast between exposed and unexposed area corresponding to step 3 of the gray scale. The contrast is determined calorimetrically using a spectrophotometer. The endpoint has been reached when a CIELAB value of 4.3 is measured. The color change of the exposed molding is expressed by the gray scale step to DIN 54001.

Surface quality of moldings: The surface quality was carried out on speaker grill panels produced on a hot runner mold with 4 hot runners. Grills were produced at hot runner temperatures of 205° C. to 265° C. in steps of 10° C. The hot runner nozzle temperature was 180° C., the injection rate 45 mm/s, the injection pressure 88 bar, the injection time 1.28 s, the screw speed 70 rpm, the cylinder 195° C., and the mold temperature 80° C. The surface of the grill panels obtained under these conditions was assessed visually by counting the number of defects (spatter marks, discolorations). The number of surface defects at one hot runner temperature was averaged over 10 speaker grills.

The results of material testing on the granules from the following inventive and comparative examples are summarized in Tables 1 to 3.

Example 1

Preparation of the Base Polymer (Polyoxymethylene Copolymer)

A batch reactor was charged at a temperature of 80° C. and a pressure of about 1 bar with 94.4% by weight of trioxane, 5.6% by weight of dioxolane and 800 ppm of methylal. 30 ppm of $BF_3$ were added to this mixture. The amounts are based on the total monomer mixture. After an induction time of 30 seconds the polymerization reaction began. The crude polymer formed was suspended in a water/triethylamine mixture and then hydrolyzed at 170° C. in a water/methanol (10/90) mixture. On cooling to room temperature, the polymer was precipitated as a fine powder. The polymer was filtered off with suction, washed with water, and dried. The product possesses a melt index (MFI) of 27 g/10 min).

Example 2

The following components are combined and mixed thoroughly in a Henschel mixer:
510 g of Granufin Samt 64, 90 g of Kronos 2220, 35.33 g of PV Echtrosa E 01, 18.67 g of Heliogen Blau K 7090, 30 g of Irganox 245, 70 g of melamine, 200 g of Licowachs E, 100 g of calcium citrate, 400 g of Tinuvin 234, 200 g of Tinuvin 770, 30 g of magnesium stearate, and polyoxymethylene base polymer from Example 1 to 100 kg. The mixture is granulated on a twin-screw extruder.

Example 3

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 10.5 g of melamine, 30 g of Licowachs E, 15 g of calcium citrate, 60 g of Tinuvin 234, 30 g of Tinuvin 770, 4.5 g of magnesium stearate, and polyoxymethylene base polymer from Example 1 to 15 kg. The mixture is granulated on a twin-screw extruder.

Example 4

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 10.5 g of melamine, 30 g of Licowachs OP, 15 g of calcium citrate, 60 g of Tinuvin 234, 30 g of Tinuvin 770, 4.5 g of magnesium stearate, and polyoxymethylene base polymer from Example 1 to 15 kg. The mixture is granulated on a twin-screw extruder.

Example 5

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 10.5 g of melamine, 30 g of Licowachs E, 60 g of Tinuvin 234, 30 g of Tinuvin 770, 4.5 g of magnesium stearate, and polyoxymethylene base polymer from Example 1 to 15 kg. The mixture is granulated on a twin-screw extruder.

Example 6

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 10.5 g of melamine, 15 g of Licowachs E, 15 g of Licowachs OP, 15 g of calcium citrate, 4.5 g of magnesium stearate, 60 g of Tinuvin 234, 30 g of Tinuvin 770, and polyoxymethylene base polymer from Example 1 to 15 kg. The mixture is granulated on a twin-screw extruder.

Example 7

The following components are combined and mixed thoroughly in a Henschel mixer:
110 g of Kronos 2220, 40 g of Renoischwarz VE, 4 g of Titanorange 6994, 1.3 g of Renoirot EKEA 06, 4.5 g of Irganox 245, 6 g of allantoin, 30 g of Licowachs E, 15 g of calcium citrate, 7.5 g of magnesium stearate, 60 g of Tinuvin 234, 30 g of Tinuvin 770, and polyoxymethylene base polymer from Example 1 to 15 kg. The mixture is granulated on a twin-screw extruder.

Example 8

The following components are combined and mixed thoroughly in a Henschel mixer:
110 g of Kronos 2220, 40 g of Renoischwarz VE, 4 g of Titanorange 6994, 1.3 g of Renolrot EKEA 06, 4.5 g of Irganox 245, 10.5 g of melamine, 30 g of Licowachs E, 15 g of calcium citrate, 7.5 g of sodium stearate, 60 g of Tinuvin 234, 30 g of Tinuvin 770, and polyoxymethylene base polymer from Example 1 to 15 kg. The mixture is granulated on a twin-screw extruder.

Example 9

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 10.5 g of melamine, 30 g of Licolub WE 4, 15 g of calcium citrate, 60 g of Tinuvin 234, 30 g of Tinuvin 770, 4.5 g of magnesium stearate, and polyoxymethylene base polymer from Example 1 to 15 kg. The mixture is granulated on a twin-screw extruder.

Example 10

The following components are combined and mixed thoroughly in a Henschel mixer:
105 g of PV Echtgelb HG, 1.65 g of Crano-Rot DPP-BP, 0.3 g of Braun EKX 881, 0.135 g of Schwarz EKV 80030, 45 g of Irganox 245, 7.5 g of melamine, 30 g of Licowachs E, 15 g of calcium citrate, 7.5 g of magnesium stearate, and polyoxymethylene base polymer from Example 1 to 15 kg. The mixture is granulated on a twin-screw extruder.

Example 11

The following components are combined and mixed thoroughly in a Henschel mixer:
596 g of Renolschwarz VE, 45 g of Sicotangelb K 2112, 60 g of Kronos 2220, 13 g of Renolbraun EKX 881, 30 g of Irganox 245, 70 g of melamine, 200 g of Licowachs E, 100 g of calcium citrate, 400 g of Tinuvin 234, 200 g of Tinuvin 770, 30 g of magnesium stearate, and polyoxymethylene base polymer from Example 1 to 100 kg. The mixture is granulated on a twin-screw extruder.

Example 12

The following components are combined and mixed thoroughly in a Henschel mixer:
190 g of Acetylene black, 330 g of Kronos 2220, 240 g of Sicotangelb K 2112, 20 g of Renolbraun EKX 851, 300 g of Irganox 245, 200 g of Licowachs E, 70 g of melamine, 50 g of magnesium stearate, 400 g of Tinuvin 234, 400 g of Tinuvin 770, 13 kg of Paraloid EXL 2600 (manufacturer. Rohm & Haas), and polyoxymethylene base polymer to 100 kg. The mixture is granulated on a twin-screw extruder.
The polyoxymethylene base polymer used in this example is prepared as in Example 1. Deviating from Example 1, however, 350 ppm of methylal were added. The base polymer has a melt index (MFI) of 9 g/10 min.

Comparative Example 1

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 4.5 g of melamine, 30 g of Licowachs C, 15 g of calcium citrate, 60 g of Tinuvin 234, 30 g of Tinuvin 770, and polyoxymethylene base polymer from Example 1 to 15 kg. The mixture is granulated on a twin-screw extruder.

Comparative Example 2

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 10.5 g of melamine, 30 g of Licowachs E, 15 g of calcium citrate, 60 g of Tinuvin 234, 30 g of Tinuvin 770, and polyoxymethylene base polymer from Example 1 to 15 kg. The mixture is granulated on a twin-screw extruder.

Comparative Example 3

The following components are combined and mixed thoroughly in a Henschel mixer:
110 g of Kronos 2220, 40 g of Renolschwarz VE, 4 g of Titanorange 6994, 1.3 g of Renolrot EKEA 06, 4.5 g of Irganox 245, 10.5 g of melamine, 15 g of calcium citrate, 60 g of Tinuvin 234, 30 g of Tinuvin 770, 4.5 g of magnesium stearate, and polyoxymethylene base polymer from Example 1 to 15 kg. The mixture is granulated on a twin-screw extruder.

Comparative Example 4

The following components are combined and mixed thoroughly in a Henschel mixer:
225 g of Kronos 2220, 30 g of Licowachs C, 4.5 g of Irganox 245, 15 g of calcium citrate, 60 g of Tinuvin 234, 30 g of Tinuvin 770, and polyoxymethylene base polymer from Example 1 to 15 kg. The mixture is granulated on a twin-screw extruder.

Comparative Example 5

The following components are combined and mixed thoroughly in a Henschel mixer:
110 g of Kronos 2220, 40 g of Renolschwarz VE, 4 g of Titanorange 6994, 1.3 g of Renolrot EKEA 06, 15 g of melamine, 30 g of Licowachs E, 7.5 g of magnesium stearate, 7.5 g of magnesium oxide, and polyoxymethylene base polymer from Example 1 to 15 kg. The mixture is granulated on a twin-screw extruder.

Comparative Example 6

The following components are combined and mixed thoroughly in a Henschel mixer:
110 g of Kronos 2220, 40 g of Renolschwarz VE, 4 g of Titanorange 6994, 1.3 g of Renolrot EKEA 06, 15 g of melamine, 30 g of Licowachs E, 7.5 g of magnesium stearate, 7.5 g of magnesium hydroxide, and polyoxymethylene base polymer from Example 1 to 15 kg. The mixture is granulated on a twin-screw extruder.

Comparative Example 7

The following components are combined and mixed thoroughly in a Henschel mixer:
596 g of Renolschwarz VE, 45 g of Sicotangelb K 2112, 60 g of Kronos 2220, 13 g of Renolbraun EKX 881, 30 g of Irganox 245, 30 g of melamine, 200 g of Licowachs C, 100 g of calcium citrate, 400 g of Tinuvin 234, 200 g of Tinuvin 770, and polyoxymethylene base polymer from Example 1 to 100 kg. The mixture is granulated on a twin-screw extruder.

Comparative Example 8

The following components are combined and mixed thoroughly in a Henschel mixer:
190 g of Acetylene black, 330 g of Kronos 2220, 240 g of Sicotangelb K 2112, 20 g of Renolbraun EKX 851, 600 g of Irganox 245, 200 g of Licowachs C, 50 g of Eurelon, 30 g of dicyandiamide, 400 g of Tinuvin 234, 400 g of Tinuvin 770, 13 kg of Paraloid EXL 2600 (manufacturer: Rohm & Haas), and polyoxymethylene base polymer to 100 kg. The mixture is granulated on a twin-screw extruder.

The polyoxymethylene base polymer used in this comparative example is prepared as in Example 12; during the preparation however, 350 ppm of methylal were added. The base polymer has a melt index (MFI) of 9 g/10 min.

Molded from the granules of the inventive and comparative examples by injection molding were the test specimens for determining the tensile elasticity modulus, the yield stress, and the elongation at break, and also the sheets for determining the formaldehyde emission and the color fastness. The granules from Inventive Example 11 and Comparative Example 7 were used to produce speaker grill panels by injection molding. The results of the mechanical tests and the color fastness test on the examples in accordance with the invention are indicated in Table 1, those on the comparative examples in Table 2. Table 3 provides the results of the investigation of the formation of surface defects on speaker grill panels (Inventive Example 11 and Comparative Example 7).

component (C1) x % by weight of an ester of a polyhydric alcohol and at least one fatty acid, component (C2) y % by weight of a partially hydrolyzed ester of a polyhydric alcohol and at least one fatty acid, the partially hydrolyzed ester including the reaction products of a full ester reacted with a metal hydroxide, x being 0.1 to 0.5% and y being 0.1 to 0.5%, and wherein said component (C1) and said component (C2) form component (C), and component (D) 0.0 to 0.5% by weight of a magnesium salt of a fatty acid, component (I) polyoxymethylene polymer and, optionally, up to 40% by weight of other additives, wherein the molding composition does not comprise hydroxides or alkoxides of alkali metals or alkaline earth metals, or their salts with inorganic acids.

TABLE 1

|  | Melt index g/10 min | Tensile elasticity modulus $N/mm^2$ | Yield stress $N/mm^2$ | Elongation at break % | VDA 275 mg/kg | PV 1303 gray scale step 5 cycles | PV 1303 gray scale step 10 cycles |
|---|---|---|---|---|---|---|---|
| Base polymer from Example 1 | 27.0 | — | — | — | — | — | — |
| Example 2 | 25.8 | 2830 | 62.4 | 19.0 | 6.7 | 5 | 4.5 |
| Example 3 | 26.9 | 2864 | 62.6 | 18.5 | 11.8 | 5 | 4.5 |
| Example 4 | 27.1 | 2802 | 62.3 | 20.8 | 14.8 | 5 | 5 |
| Example 5 | 24.3 | 2845 | 62.4 | 23.5 | 19.7 | 5 | 4.5 |
| Example 6 | 26.7 | 2860 | 62.5 | 18.1 | 8.0 | 5 | 4.5 |
| Example 7 | 25.6 | 2822 | 62.3 | 22.8 | 8.4 | 5 | 4.5 |
| Example 8 | 26.2 | 2815 | 62.2 | 19.7 | 12.1 | 5 | 4.5 |
| Example 9 | 24.6 | 2863 | 62.8 | 23.0 | 11.6 | 5 | 5 |
| Example 10 | 27.3 | 2843 | 62.4 | 21.7 | 13.8 | 4 | 3.5 |
| Example 11 | 26.8 | 2822 | 62.3 | 20.5 | 12.9 | 5 | 4 |
| Example 12 | 5.4 | 2100 | 44.6 | 61 | 16 | 4.5 | 4 |

TABLE 2

|  | Melt index g/10 min | Tensile elasticity modulus $N/mm^2$ | Yield stress $N/mm^2$ | Elongation at break % | VDA 275 mg/kg | PV 1303 gray scale step 5 cycles | PV 1303 gray scale step 10 cycles |
|---|---|---|---|---|---|---|---|
| Comparative Example 1 | 25.2 | 2850 | 63.0 | 25.7 | 126.0 | 5 | 4.5 |
| Comparative Example 2 | 26.1 | 2860 | 62.4 | 18.7 | 34.8 | 5 | 4.5 |
| Comparative Example 3 | 26.0 | 2812 | 62.2 | 24.3 | 76.5 | 5 | 4.5 |
| Comparative Example 4 | 24.6 | 2868 | 62.7 | 19.1 | 112.0 | 5 | 5 |
| Comparative Example 5 | 26.7 | 2835 | 62.3 | 21.5 | 37.3 | 3.5 | 2 |
| Comparative Example 6 | 27.0 | 2864 | 62.5 | 22.2 | 41.0 | 3 | 2 |
| Comparative Example 7 | 25.5 | 2833 | 62.4 | 20.8 | 80.5 | 5 | 4 |
| Comparative Example 8 | 5.2 | 2050 | 42.9 | 55 | 225 | 4 | 3 |

TABLE 3

| | Number of surface defects on speaker grill panels | | | | | | |
|---|---|---|---|---|---|---|---|
|  | Hot runner temperature 205° C. | Hot runner temperature 215° C. | Hot runner temperature 225° C. | Hot runner temperature 235° C. | Hot runner temperature 245° C. | Hot runner temperature 255° C. | Hot runner temperature 265° C. |
| Example 11 | 0 | 0 | 0 | 0 | 0 | 1 | 2 |
| Comparative Example 7 | 1 | 1 | 2 | 4 | 4 | 5 | 6 |

The invention claimed is:

1. A colored polyoxymethylene molding composition consisting essentially of component (A) from 0.1 to 5.0% by weight of colorant, component (B) from 0.01 to 0.5% by weight of a nitrogen-containing stabilizer, 2. The colored polyoxymethylene molding composition as claimed in claim 1, consisting essentially of component (A) from 0.5 to 2.0% by weight, component (B) from 0.03 to 0.3% by weight, component (C1) from 0.1 to 0.5% by weight, component(C2) from 0.1 to 0.5% by weight, and component (D) from 0.01 to 0.2% by weight.

3. The colored polyoxymethylene molding composition as claimed in claim 2, wherein said component (D) is present from 0.01 to 0.1% by weight.

4. The colored polyoxymethylene molding composition as claimed in claim 3, wherein said component (A) is titanium dioxide, ultramarine blue, cobalt blue, phthalocyanine, anthraquinone or carbon black or mixture thereof or together with polymer soluble dyes.

5. The colored polyoxymethylene molding composition as claimed in claim 2, further consisting essentially of
component (E) 0.01-0.05% by weight of a metal salt of a short-chain carboxylic acid,
component (F) up to 0.4% by weight of a sterically hindered phenol compound,
component (G) 0.01-0.9% by weight of at least one stabilizer selected from the group consisting of benzotriazole derivatives and aromatic benzoate derivatives, and
component (H) 0.01-0.4% by weight of a sterically hindered amine (HALS) as a light stabilizer.

6. The colored polyoxymethylene molding composition as claimed in claim 5, wherein component (B) is heterocyclic compounds having at least one nitrogen atom as heteroatom, adjacent to which is either an amino-substituted carbon atom or a carbonyl group; pyridazine; pyrimidine; pyrazine; pyrrolidone; aminopyridine or compounds derived therefrom; melamine; 2,6-diaminopyridine; substituted or dimeric aminopyridines; melamine-formaldehyde condensates; polyamides; dicyandiamide; urea or its derivatives; pyrrolidone or compounds derived therefrom; imidazolidinone or compounds derived therefrom; hydantoin or its derivatives; allantoin or its derivatives or mixtures prepared from these compounds.

7. The colored polyoxymethylene molding composition as claimed in claim 5, wherein said component (E) is a propionate, citrate or pyruvate, or a salt of another carboxylic acid having from 3 to 8 carbon atoms, and a salt with alkali metals or with alkaline earth metals or with other mono- or bivalent metal ions.

8. The colored polyoxymethylene molding composition as claimed in claim 5, wherein said component (E) is calcium citrate.

9. The colored polyoxymethylene molding composition as claimed in claim 5, wherein said component (F) is present and is pentaerythrityl tetrakis[3-(3,5-di-tert-butyl-4-hydroxyphenyl)propionate, triethylene glycol bis[3-(3-tert-butyl-4-hydroxy-5-methylphenyl)propionate], 3,3'-bis[3-(3,5-di-tert-butyl-4-hydroxyphenyl)propionohydrazide], hexamethylene glycol bis[3-(3,5-di-tert-butyl-4-hydroxyphenyl)propionate] or 3,5-di-tert-butyl-4-hydroxytoluene.

10. The colored polyoxymethylene molding composition as claimed in claim 5, wherein said component (G) is 2-[2'-hydroxy-3',5'-bis(1,1-dimethylbenzyl)phenyl]benzotriazole.

11. The colored polyoxymethylene molding composition as claimed in claim 5, wherein said component (H) is present and is bis(2,2,6,6-tetramethyl-4-piperidyl) sebacate, the polymer made from dimethyl succinate and 1-(2-hydroxyethyl)-4-hydroxy-2,2, 6,6-tetramethyl-4-piperidine or 2,2,6,6-tetramethyl-4-piperidyl or mixtures thereof.

12. The colored polyoxymethylene molding composition as claimed in claim 5, which further comprises not more than 40% by weight of at least one further additive selected from the group consisting of nucleating agents, talc, fillers, inorganic fibers, organic fibers, glass fibers with a length of >3 mm, thermoplastic or thermoset polymeric additives, elastomers and graft copolymers whose core has been prepared by polymerizing 1,3-butadiene, isoprene, n-butyl acrylate, ethylhexyl acrylate, or mixtures thereof, and whose shell has been prepared by polymerizing styrene, acrylonitrile or (meth)acrylates.

13. The colored polyoxymethylene molding composition as claimed in claim 5, which further consists essentially of not more than 40% by weight of at least one further additive selected from the group consisting of polyoxymethylene terpolymers, glass beads, wollastonite, loam, molybdenum disulfide, graphite, glass fibers, carbon fibers, aramid fibers, thermoplastic or thermoset polymeric additives, polyethylene, polyurethane, polymethyl methacrylate, polybutadiene, or polystyrene and graft polymers whose core has been prepared by polymerizing 1,3-butadiene, isoprene, n-butyl acrylate, ethylhexyl acrylate, or mixtures thereof, and whose shell has been prepared by polymerizing styrene, acrylonitrile or (meth)acrylates.

14. The colored polyoxymethylene molding composition as claimed in claim 2, further consisting essentially of
component (E) 0.05-0.2% by weight of a metal salt of a short-chain carboxylic acid,
component (F) up to 0.1% by weight of a sterically hindered phenol compound,
component (G) 0.02-0.8% by weight of at least one stabilizer selected from the group consisting of benzotriazole derivatives and aromatic benzoate derivatives, and
component (H) 0.4% by weight of a sterically hindered amine (HALS) as a light stabilizer.

15. The colored polyoxymethylene molding composition as claimed in claim 2, wherein said component (A) is inorganic pigments, organic pigments or colors or a mixture thereof, or together with polymer-soluble dyes.

16. The colored polyoxymethylene molding composition as claimed in claim 15, wherein said component (B) is melamine, methylolmelamine, melamine-formaldehyde condensates or allantoin or a mixture thereof.

17. The colored polyoxymethylene molding composition as claimed in claim 16, wherein
said component (A) is inorganic pigments, organic pigments or colors or a mixture thereof, or together with polymer-soluble dyes,
said component (B) is melamine, methylolmelamine, melamine-formaldehyde condensates or allantoin or a mixture thereof and
said component (C1) is a diester of glycol or glycerol and montanic acid.

18. The colored polyoxymethylene molding composition as claimed in claim 1, wherein said component (C1) is an ester of a polyhydric alcohol and a higher fatty acid having from 10 to 32 carbon atoms and component (C2) is a partially hydrolyzed ester of a polyhydric alcohol having from 2 to 8 carbon atoms and at least one fatty acid.

19. The colored polyoxymethylene molding composition as claimed in claim 1, wherein said component (C1) is an ester of a polyhydric alcohol and a higher fatty acid having from 24 to 32 carbon atoms and component (C2) is a partially hydrolyzed ester of a polyhydric alcohol having from 2 to 5 carbon atoms and at least one fatty acid.

20. The colored polyoxymethylene molding composition as claimed in claim 1, wherein said component (C1) is an ester of montanic acid and a polyhydric alcohol, and/or an ester of ethylene glycol, glycerol, butylene glycol or pentaerythritol as the polyhydric alcohol component and at least one fatty acid.

21. The colored polyoxymethylene molding composition as claimed in claim 1, wherein said component (D) is a magnesium salt of a saturated or unsaturated fatty acid having from 10 to 32 carbon atoms.

22. The colored polyoxymethylene molding composition as claimed in claim 1, wherein said component (D) is a magnesium salt of a saturated or unsaturated stearic, lauric, oleic, behenic, montanic or palmitic acid.

23. The colored polyoxymethylene molding composition as claimed in claim 1, wherein said component (D) is present.

24. The colored polyoxymethylene molding composition as claimed in claim 1, wherein the fatty acid used in component (C1) or (C2) has from 10 to 32 carbon atoms or the fatty acid used in components (C1) and (C2) have 10 to 32 carbon atoms, and/or the polyhydric alcohols used in components (C1) and/or (C2) have from 2 to 8 carbon atoms.

25. The colored polyoxymethylene molding composition as claimed in claim 24, wherein the fatty acid used in component (C1) or (C2) is montanic acid or is a fatty acid which has from 24 to 32 carbon atoms, or the fatty acid used in components (C1) and (C2) are montanic acid or is a fatty acid which has from 24 to 32 carbon atoms, and/or the polyhydric alcohols used in components (C1) and/or (C2) have been selected from the group consisting of ethylene glycol, glycerol, butylene glycol, pentaerythritol and have from 2 to 5 carbon atoms, and component (C2) further containing metal ions and the metal ions used in component (C2) are alkali metal ions, alkaline earth metal ions, or other mono- or bivalent metal ions.

26. The colored polyoxymethylene molding composition as claimed in claim 1, wherein said component (C1) is a diester of glycol or glycerol and montanic acid and/or component (C2) is a partially-hydrolyzed ester of butylene glycol and montanic acids whose excess montanic acid moieties have been saponified using calcium hydroxide.

27. A process for reducing the number of surface defects and/or for emission reduction and/or for color stabilization in polyacetal molding compositions, which comprises producing the composition as claimed in claim 1.

28. The process for emission reduction in polyacetal molding compositions as claimed in claim 27, wherein emission of formaldehyde is reduced.

29. A film comprising the molding composition as claimed in claim 1.

30. A molding with reduced emission and/or with a defect-free surface and/or with high color fastness, comprising the molding composition as claimed in claim 1.

* * * * *